Patented Feb. 15, 1944

2,341,653

UNITED STATES PATENT OFFICE 2,341,653

LONG-FIBER LIGHT-WEIGHT TIMBER

Pier Carlo Ricchiardi and Enzo Zillo, Paris, France; vested in the Alien Property Custodian No Drawing. Application November 5, 1940, Serial No. 364,400

2 Claims. (Cl. 21—7)

The wood of *Euphorbia candelabrum* and other plants of the genus Euphorbiaceae has not been utilized to date as timber on account of the fact that soon after the trees are cut, their woody portion decays into a decomposed useless mass. Chemical treatments have been resorted to in an attempt to make the wood of *Euphorbia candelabrum* durable, but without success, so that it has not been possible to utilize this tree which abounds in the territories situated at altitudes between 1000 and 2000 meters above sea level in all tropical and sub-tropical regions of Africa and America.

The object of this invention is to provide a novel industrial product consisting of the woody portion of the timber of *Euphorbia candelabrum* and similar plants of the genus Euphorbiaceae rendered perfectly and unqualifiedly durable and a process for obtaining same. The timber obtained possesses peculiar properties which are not inherent to any other wood, viz., a specific gravity of about 0.32, waterproofness, elasticity and rigidity at the different temperatures; moreover, it is highly resonant, unattacked by wood-worms, termites and other insects.

The process conferring on the wood the above valuable properties consists in subjecting the wood of *Euphorbia candelabrum* or similar plant of the genus Euphorbiaceae within a few days after it has been cut, to a mechanical treatment for the complete removal of the pith contained in its centre and of the bark. It is essential to remove all of the pith from the trunk, as even a small quantity of the pithy substance remaining in the center of the trunk would lead to a rapid alteration and decomposition of the wood.

As the pith is a gelatinous substance and the central duct is of a width of about seven centimeters and of a star-shaped or square section, the thorough removal of the pith is commercially carried out conveniently by means of a brush, which separates the pith from every recess of the central bore and brings it to the outside, while any pith residue, which might injuriously affect durability if left in the wood, is conveniently removed by means of a jet of compressed air.

The bark is then stripped from the trunk and the latter is allowed to season in order to eliminate the moisture contained therein, whereupon the wood is for the first time ready for commercial use and the timber lends itself to a great variety of uses on account of its valuable properties.

The juice yielded by the trunk as it is being stripped of the bark, which contains a number of useful products, chiefly creosotes, resins, formalin, isoprene and oils, is a useful by-product of the process, that may be profitably utilized for commercial purposes.

What we claim is:

1. Process for the production of a long-fiber, water-proof, elastic and durable timber from a tree of the genus Euphorbiaceae, consisting in totally removing from the trunk of the tree, within a few days after it has been cut, the pith contained in the center of the trunk and the bark and in allowing the wood to season in order to eliminate moisture.

2. Process for the production of a long-fiber, water-proof, elastic and durable timber from a tree of the genus Euphorbiaceae, consisting in totally removing from the trunk of the tree, within a few days after it has been cut, the pith by means of a brush for separating the pith particles from the walls of recesses of the trunk center and by successively applying a jet of compressed air for removing every pith residue.

PIER CARLO RICCHIARDI.
ENZO ZILLO.